US008139041B2

(12) United States Patent
Na

(10) Patent No.: US 8,139,041 B2
(45) Date of Patent: Mar. 20, 2012

(54) LIQUID CRYSTAL DISPLAY HAVING TOUCH SCREEN FUNCTION USING PHOTOCONDUCTOR

(75) Inventor: Se Hwan Na, Icheon-Si (KR)

(73) Assignee: Hydis Technologies Co., Ltd., Gyeonggi-Do (KR)

( * ) Notice: Subject to any disclaimer, the term of this patent is extended or adjusted under 35 U.S.C. 154(b) by 755 days.

(21) Appl. No.: 12/339,260

(22) Filed: Dec. 19, 2008

(65) Prior Publication Data

US 2010/0090984 A1   Apr. 15, 2010

(30) Foreign Application Priority Data

Oct. 14, 2008   (KR) .................... 10-2008-0100446

(51) Int. Cl.
*G06F 3/041* (2006.01)
(52) U.S. Cl. ...................................................... 345/173
(58) Field of Classification Search .................. 345/173, 345/104, 102, 166, 170, 176, 180, 182, 183; 349/116; 396/14; 707/5
See application file for complete search history.

(56) References Cited

U.S. PATENT DOCUMENTS

| | | | | |
|---|---|---|---|---|
| 7,626,575 B2 * | 12/2009 | Cho et al. | | 345/173 |
| 7,936,983 B2 * | 5/2011 | Konno et al. | | 396/14 |
| 2007/0268243 A1 * | 11/2007 | Choo et al. | | 345/104 |
| 2008/0117181 A1 * | 5/2008 | Park et al. | | 345/173 |
| 2008/0218489 A1 * | 9/2008 | Park et al. | | 345/173 |
| 2009/0046077 A1 | 2/2009 | Tanaka et al. | | |
| 2009/0115741 A1 * | 5/2009 | Wang et al. | | 345/173 |
| 2009/0125508 A1 * | 5/2009 | Collins et al. | | 707/5 |
| 2009/0146967 A1 * | 6/2009 | Ino et al. | | 345/173 |
| 2009/0160815 A1 * | 6/2009 | Steer | | 345/173 |
| 2009/0256812 A1 * | 10/2009 | Ha et al. | | 345/173 |
| 2009/0309844 A1 * | 12/2009 | Woo et al. | | 345/173 |
| 2010/0079404 A1 * | 4/2010 | Degner et al. | | 345/174 |
| 2010/0156807 A1 * | 6/2010 | Stallings et al. | | 345/173 |

FOREIGN PATENT DOCUMENTS

WO   2007102238 A1   9/2007

OTHER PUBLICATIONS

Boer et al.; "Active Matrix LCD With Integrated Optical Touch Screen"; SID 03 Digest; 2003; 4 pages; ISSN/0003-0966X/03/3403-0694.
Lee et al.; "Hybrid Touch Screen Panel Integrated in TFT-LCD"; SID 07 Digest; 2007; pp. 1101-1104; ISSN/007-0966X/07/3802.
Kowk K. Ng; "Photoconductor"; Complete Guide to Semiconductor Devices; Jul. 2002; pp. 423-430; 2nd Edition.
"Microcontact Printing"; Machines and Materials; Jan. 15, 2003; pp. 118-127; vol. 15, No. 1.
Theories and Application of Chem. Eng.; Jan. 12, 2006; p. 1005; vol. 12, No. 1.

* cited by examiner

*Primary Examiner* — Fred Tzeng
(74) *Attorney, Agent, or Firm* — The Webb Law Firm

(57) ABSTRACT

Provided is a liquid crystal display (LCD) having a touch screen function using a photoconductor, which includes first and second substrates and a liquid crystal layer filled therebetween. The first substrate includes a touch sensing layer formed under a substrate and sensing a position by variation in current or voltage due to change in characteristics of the photoconductor in response to light supplied from outside, a light shielding layer formed under the touch sensing layer and preventing leakage of light, and a color filter layer including red (R), green (G) and blue (B) color filter patterns to express a color between the light shielding layer, thereby effectively finding a touch position according to a current variation depending on a change in characteristics of the photoconductor by the light supplied from outside.

15 Claims, 6 Drawing Sheets

FIG. 4
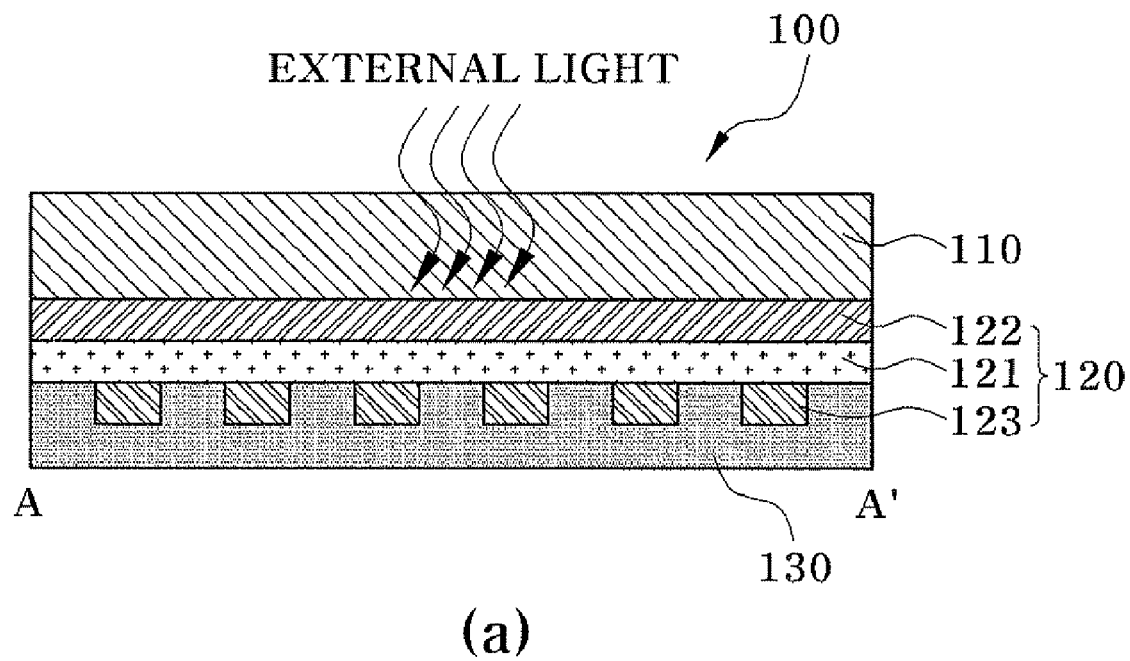
(a)
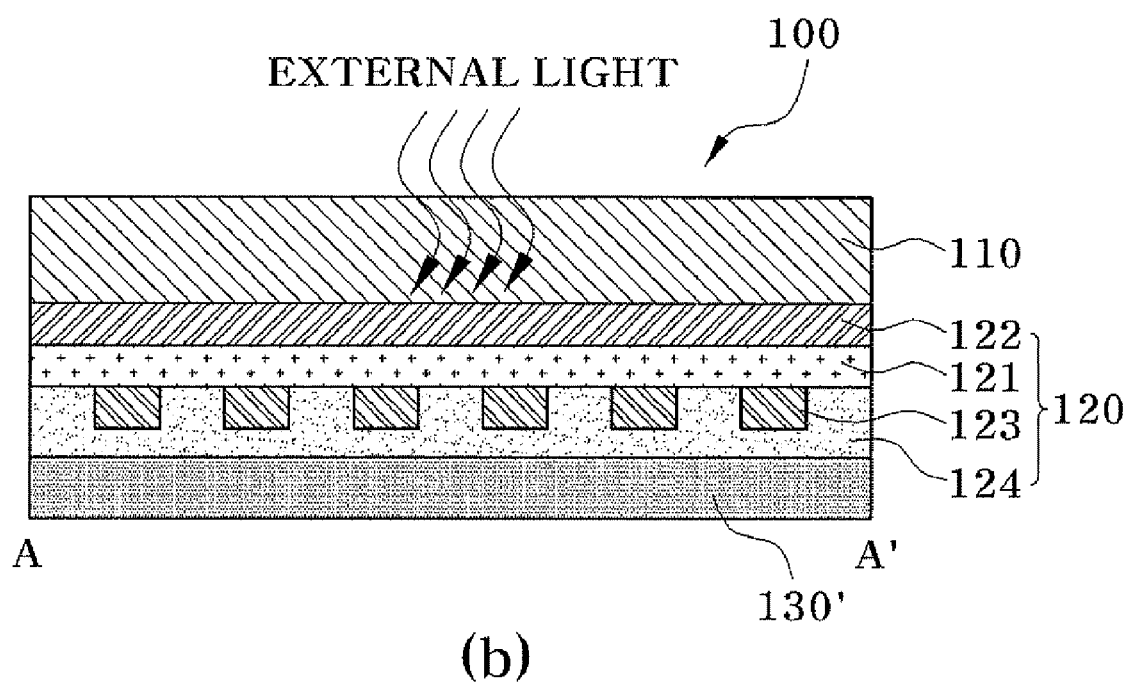
(b)

FIG. 5
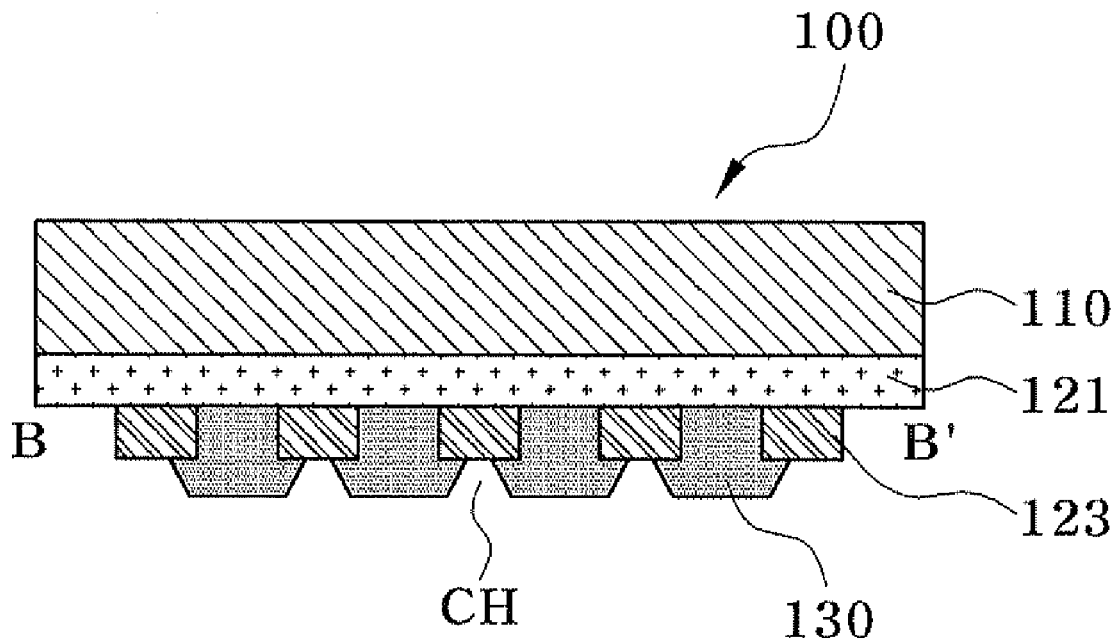
(a)
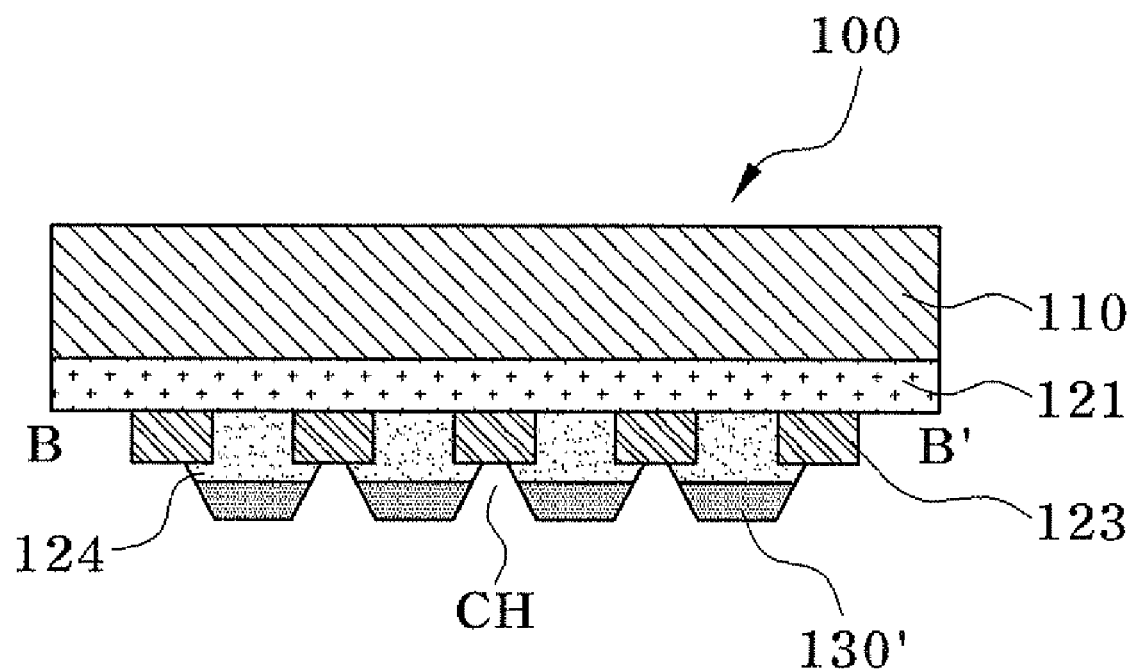
(b)

FIG. 6
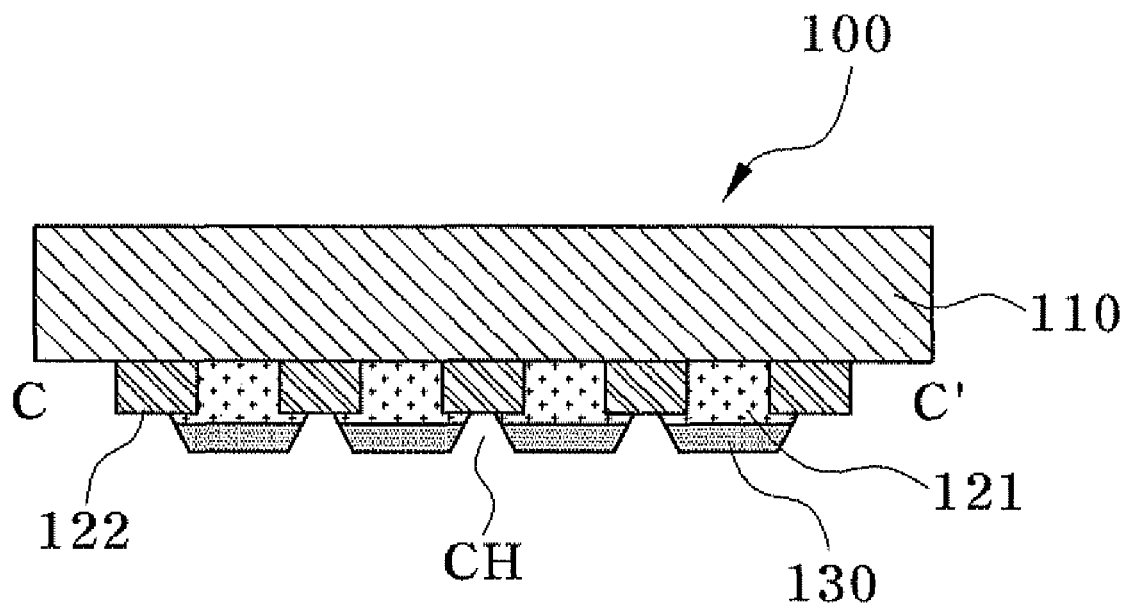
(a)
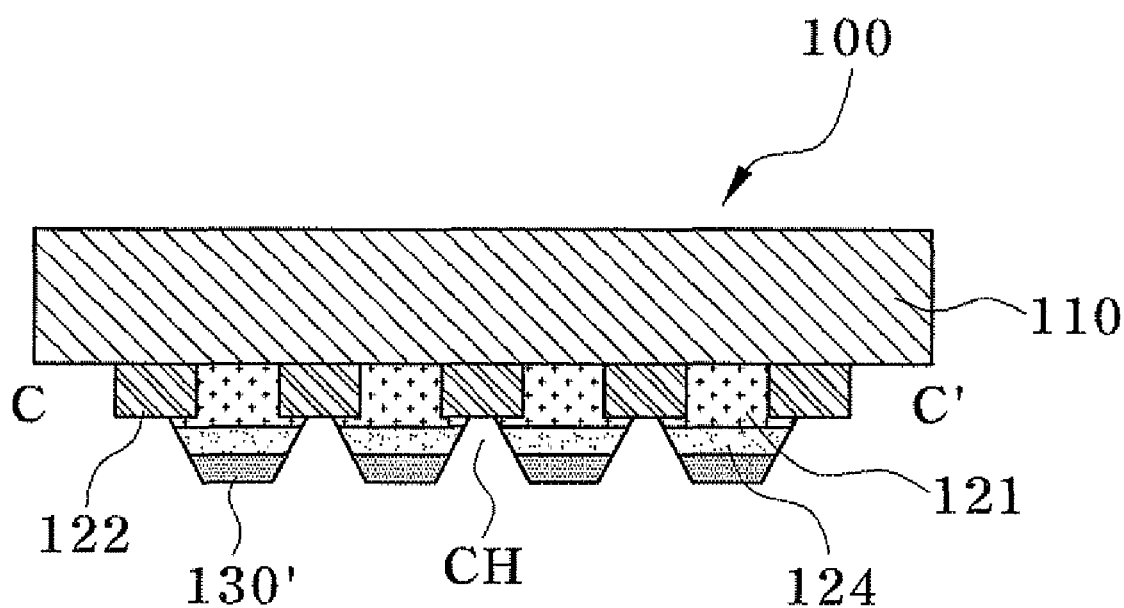
(b)

LIQUID CRYSTAL DISPLAY HAVING TOUCH SCREEN FUNCTION USING PHOTOCONDUCTOR

CROSS-REFERENCE TO RELATED APPLICATION

This application claims priority to and the benefit of Korean Patent Application No. 2008-100446, filed Oct. 14, 2008, the disclosure of which is incorporated herein by reference in its entirety.

BACKGROUND

1. Field of the Invention

The present invention relates to a liquid crystal display (LCD) having a touch screen function using a photoconductor, and more particularly, to an LCD having a touch screen function using a photoconductor in which a photoconductive material is deposited between an insulating substrate provided in a color filter substrate of a liquid crystal panel and a light shielding layer so that a touch position can be effectively found by variation in current or voltage due to a change in characteristics of the photoconductor in response to light supplied from outside.

2. Discussion of Related Art

Generally, an LCD is a compact and thin flat panel display with low power consumption. It is used in portable computers such as notebook computers, office automation systems, and audio/video systems.

Recent dramatic development of LCD technology has led to the creation of high-resolution LCDs capable of displaying high-resolution graphics. Also, a digitizer is being used as an input device in notebook computers.

A digitizer installed in a notebook computer can perform the same function as a cathode ray tube (CRT)-type touch screen used in a desktop computer.

The digitizer installed in an LCD is called a touch screen or a tablet, and a resistive type touch screen and a capacitive type touch screen are the most common types, one of which is selected depending on the type of detecting a user-indicating position.

The resistive type touch screen operates by separating two parallel transparent electrodes using a dot spacer and detecting a voltage variation occurring when the upper and lower transparent electrodes are in contact with each other by a pressure applied from outside. The capacitive type touch screen recognizes a position by detecting capacitance coupling using an alternating voltage supplied from outside.

In addition, an IR type touch screen detects a variation in infrared radiation emitted from outside of a panel, and a surface acoustic wave (SAW) type touch screen detects a variation in acoustic waves caused by touching a display surface.

The above-mentioned conventional touch screen panel technology is attached as a module to the outside of a display. Consequently, its structure may reduce transmittance and degrade displayed images, and it may be vulnerable to external stimuli such as scratching.

To solve these problems, a new method of placing an optical sensor device such as a photodiode or a photo thin film transistor (TFT) in a pixel of a panel and recognizing a touch by light supplied from outside, or finding a fine capacitance variation inside a panel, is being applied {c.f., W. D. Boer et al., SID'03 DIGEST 1494 (2003), Joohyung Lee et al., SID'07 DIGEST 1101 (2006)}.

However, these methods of using an optical sensor and detecting a capacitance variation decrease an aperture ratio of a pixel, thereby lowering transmittance and brightness and degrading displayed images. Also, since a detected signal is very weak, many peripheral devices are needed, which increases production costs.

SUMMARY OF THE INVENTION

The present invention is directed to providing a liquid crystal display (LCD) having a touch screen function using a photoconductor, in which a photoconductive material is deposited between an insulating substrate provided in a color filter substrate of a liquid crystal panel and a light shielding layer, and thus a touch position can be effectively found by variation in current or voltage due to change in characteristics of the photoconductor in response to light supplied from outside.

One aspect of the present invention provides an LCD having a touch screen function using a photoconductor, which includes: first and second substrates, and a liquid crystal layer filled between the first and second substrates. Here, the first substrate includes a touch sensing layer formed under the substrate and sensing a touch position by variation in current or voltage due to change in characteristics of the photoconductor in response to light supplied from outside; light shielding layer formed under the touch sensing layer and preventing leakage of light; and a color filter layer including red (R), green (G) and blue (B) color filter patterns to express colors between patterns of the light shielding layer.

Here, the touch sensing layer may be formed of an insulating film having a predetermined thickness, and first and second photoconductive strips perpendicularly crossing each other with the insulating film interposed therebetween.

The first and second photoconductive strips may be formed between the substrate and the light shielding layer in the same pattern as that of the light shielding layer.

At least one contact hole may be further included at contact portions in the light shielding layer and the insulating film to expose the first and second photoconductive strips, in order to make electrical contacts between a source supplying current or voltage to the touch sensing layer, an integrated circuit processing sensing signals from the touch sensing layer, and the first and second photoconductive strips.

When the light shielding layer is formed of a conductive material, an insulating layer may be further formed to a predetermined thickness between the touch sensing layer and the light shielding layer or between the second photoconductive strip and the light shielding layer.

At least one contact hole may be further included at contact portions in the light shielding layer, the insulating layer, and the insulating film to expose the first and second photoconductive strips, in order to make electrical contacts between a source supplying current or voltage to the touch sensing layer, an integrated circuit processing sensing signals from the touch sensing layer, and the first and second photoconductive strips.

The source and the integrated circuit may be formed on the first substrate to be in direct contact with the first and second photoconductive strips through the contact hole, or on the second substrate to be in contact with the first and second photoconductive strips through the contact hole using additional conductive material. Alternatively, they may be in contact using an external source and integrated circuit.

The photoconductor may be formed of one selected from the group consisting of CdS, CdSe, ZnO, Se, PbS, InSb and PbO.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIG. 4 is a cross-sectional view taken along line A-A' of FIG. 3;

FIG. 5 is a cross-sectional view taken along line B-B' of FIG. 3; and

FIG. 6 is a cross-sectional view taken along line C-C' of FIG. 3.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

A liquid crystal display (LCD) according to the present invention includes photoconductive strips for recognizing light supplied from outside to sense a touch, which are separated in horizontal and vertical directions with an insulating film interposed there between and cross in a matrix arrangement.

Figure 1:
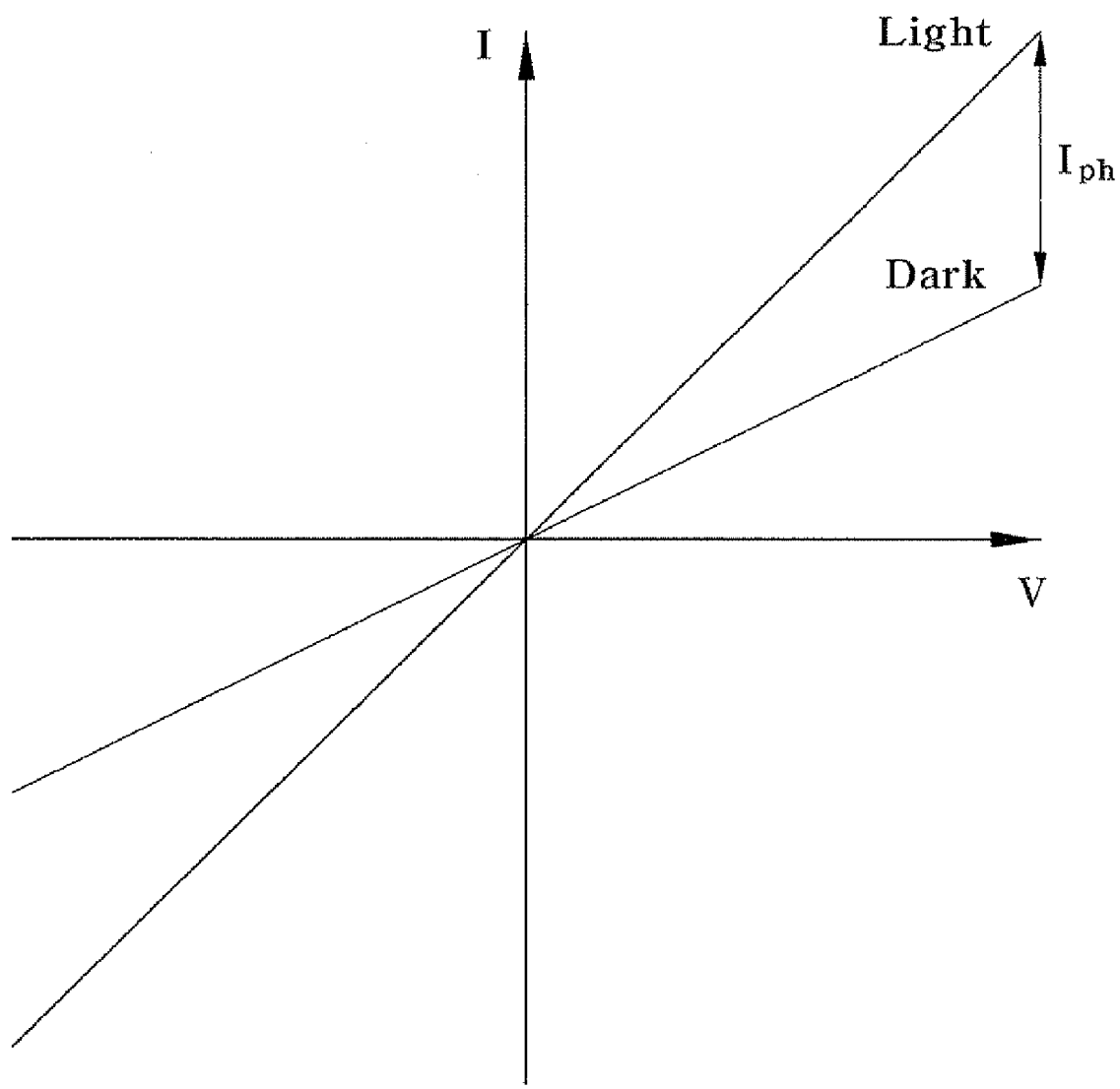
FIG. 1 is a graph illustrating a current-voltage (I-V) characteristic of a photoconductor according to light irradiation.

FIG. 1 is a graph illustrating a current-voltage (I-V) characteristic of a photoconductor according to light irradiation, from which it can be noted that a common photoconductor (e.g., CdS, CdSe, ZnO, Se, PbS, InSb or PbO) changes resistance depending on how much it is exposed to light {c.f., Complete Guide to Semiconductor Device $2_{nd}$ Ed. Kowk K. NG pp.423}.

Figure 2:
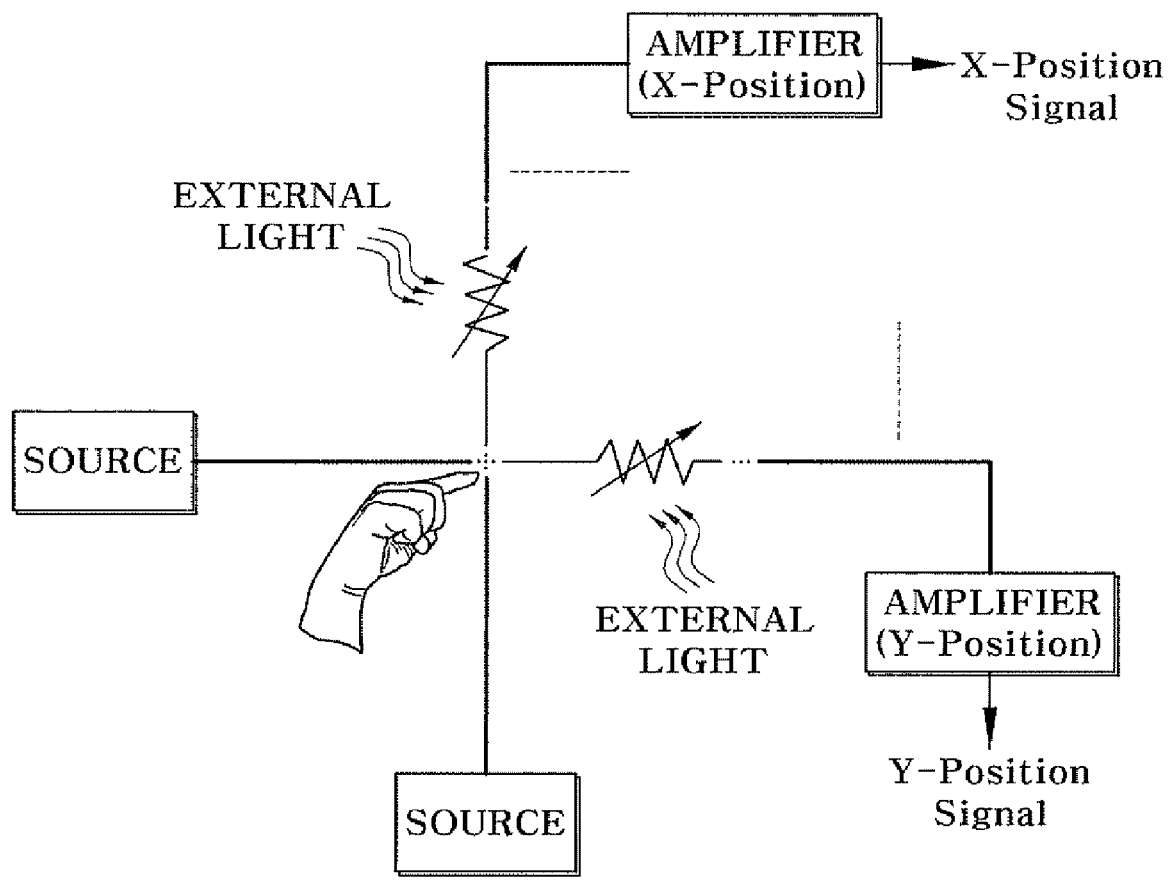
FIG. 2 is a schematic conceptual diagram illustrating a principle of a liquid crystal display having a touch screen function using a photoconductor according to an exemplary embodiment of the present invention.

FIG. 2 is a schematic conceptual diagram illustrating a principle of an LCD having a touch screen function using a photoconductor according to an exemplary embodiment of the present invention.

Referring to FIG. 2, a current or voltage is generated when external light is incident on a liquid crystal panel when a predetermined level of voltage or current is supplied from a source to a photoconductor.

Here, when the panel is touched, the external light is shielded, and a shadowed portion has a different resistance from a portion that is not shadowed, which results in a difference in current or voltage.

Such a difference in current or voltage may be detected outside of the liquid crystal panel, thereby easily finding touch positions (X-position and Y-position).

Preferably, an amplifier may be installed outside of the liquid crystal panel to amplify and detect the difference in current or voltage, thereby easily finding touch positions (X-position and Y-position).

Figure 3:
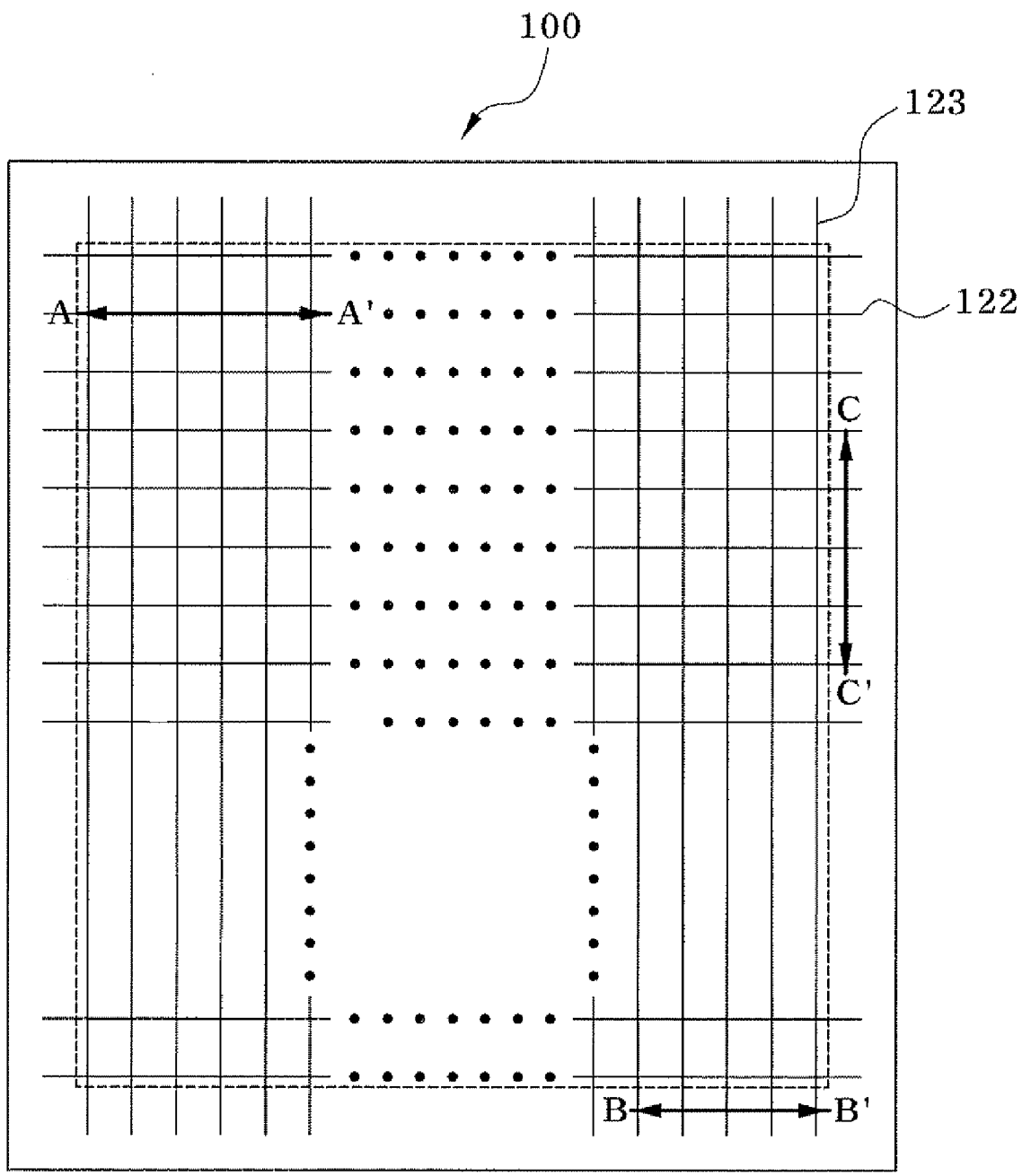
FIG. 3 is a schematic plan view of a color filter substrate of an LCD having a touch screen function using a photoconductor according to an exemplary embodiment of the present invention.

FIG. 3 is a schematic plan view of a color filter substrate of an LCD having a touch screen function using a photoconductor according to an exemplary embodiment of the present invention, and FIGS. 4 to 6 are cross-sectional views taken along lines A-A', B-B' and C-C', respectively.

Referring to FIGS. 3 to 6, an LCD having a touch screen function using a photoconductor according to an exemplary embodiment of the present invention includes a first substrate 100 and a second substrate (not illustrated), which face each other, and a liquid crystal layer (not illustrated) filled between the two substrates.

Here, the first substrate 100 is a color filter (C/F) substrate, which includes an insulating substrate 110, a touch sensing layer 120, a light shielding layer (e.g., a black matrix) 130 or 130' and a color filter layer (not illustrated).

The touch sensing layer 120 is formed under the insulating substrate 110, and serves to sense a touch position by variation in current or voltage due to change in characteristics of the photoconductor in response to light supplied from outside.

The touch sensing layer 120 is composed of an insulating film 121 having a predetermined thickness, and first and second photoconductive strips 122 and 123 which are separated in horizontal and vertical directions with the insulating film 121 interposed therebetween, and cross in a matrix arrangement.

The first and second photoconductive strips 122 and 123 are formed between the insulating substrate 110 and the light shielding layer 130 or 130' in the same pattern as the light shielding layer 130 or 130' to be described later, and may shield inner light generated from a backlight unit (not illustrated) provided in the LCD to effectively prevent malfunction caused by the inner light during detection of the position by the touch sensing layer 120.

Meanwhile, while the conventional photoconductive material was difficult to form a thin film or pattern, it is now possible to pattern due to the development of processing techniques such as atomic layer deposition (ALD) and microcontact printing {c.f., Machines and Materials Vol. 15, No. 1 pp. 118, Theories and Application of Chem. Eng., 2006, Vol. 12, No. 1 pp. 1005}.

The photoconductive materials include materials operating in the visible region such as CdS, CdSe, ZnO and Se, materials operating in the infrared region such as PbS, InSb and Ge:Au, and materials operating in the ultraviolet region such as PbO, and thus may be applied in various ways. CdS, CdSe, ZnO and Se are the most commonly used photoconductive materials.

Further, the light shielding layer 130 or 130' is a light shielding region for preventing leakage of light, and is formed at predetermined intervals under the touch sensing layer 120. Red (R), green (G) and blue (B) color filters are divided from each other by the light shielding layer.

The light shielding layer 130 or 130' is formed of a photosensitive organic material to which a black dye is generally added. Thus, as illustrated in FIG. 4(a), the light shielding layer 130 is not necessarily insulated from a second photoconductive strip 123, but as illustrated in FIG. 4(b), the light shielding layer 130' formed of a conductive material may be insulated from the second photoconductive strip 123 by interposing an insulating layer 124 of a predetermined thickness between them.

Meanwhile, as illustrated in FIGS. 5 and 6, the insulating film 121, the light shielding layer 130 and 130', and the insulating layer 124 may have at least one contact hole (CH) in each contact portion to expose the first and second photoconductive strips 122 and 123. This is in order to make electrical contacts between the first and second photoconductive strips 122 and 123, a source supplying voltage or current to the touch sensing layer 120, and an integrated circuit (IC) processing a signal sensed from the touch sensing layer 120.

The source and the IC may be formed on the first substrate 100 to be in direct contact with the first and second photoconductive strips 122 and 123 through the contact hole (CH), or may be formed on the second substrate to be in contact with the first and second photoconductive strips 122 and 123 through the contact hole (CH) using additional conductive material. Alternatively, they may be in contact using an external source and IC.

Meanwhile, when the source is connected to one end of each of the first and second photoconductive strip 122 and 123 to supply a predetermined voltage or current, and the IC is connected to the other end of each of the first and second photoconductive strip 122 and 123 to detect a difference in current or voltage in the first and second photoconductive strips 122 and 123 and compare signals detected before and during touching, a touch position can be found.

The color filter layers are generally formed by arranging red, green and blue (R, G and B) color filter patterns one by one between patterns of the light shielding layer 130, and serve to provide color to light radiated from a backlight unit (not illustrated) and passing through the liquid crystal layer. Such color filter layers are generally formed of photosensitive organic materials.

An overcoat layer (not illustrated) may be additionally formed under the color filter layer to remove a step difference caused by the color filter layer and improve planarization.

And, the second substrate is a thin film transistor (TFT) array substrate, which is not illustrated in the drawings but generally includes gate and data interconnections defining unit pixels, TFTs formed at crossing points between the gate and data interconnections, and common and pixel electrodes.

Preferably, the second substrate may further include a source which supplies voltage or current to the first and second photoconductive strips 122 and 123, and an integrated circuit which detects a variation of the signal provided from the first and second photoconductive strips 122 and 123 in a non-display region which does not display an image.

Meanwhile, the LCD having a touch screen function using a photoconductor according to the exemplary embodiment of the present invention is preferably a transmission-type LCD displaying colors by controlling light incident on the liquid crystal from a backlight, which is a light source attached to a bottom surface of the liquid crystal panel, according to an arrangement of the liquid crystal. However, the present invention is not limited to the examples described herein and can be applied to all kinds of LCDs using optical anisotropy and polarization of the liquid crystal. For example, it may be applied to a reflection-type LCD controlling the transmission of light according to the arrangement of liquid crystals by reflecting natural or artificial light provided from outside, and transflective-type LCDs. In addition, the present invention can be applied to various flat panel displays such as a plasma display panel (PDP), an electro luminescent display (ELD) and a vacuum fluorescent display (VFD).

As described above, a liquid crystal display (LCD) having a touch screen function using a photoconductor of the present invention includes a photoconductor disposed between an upper substrate of a liquid crystal panel, which is an insulating substrate provided in a color filter substrate, and a light shielding layer. Thus, the LCD can effectively find a touch position by variation in current or voltage due to change in characteristics of the photoconductor in response to light supplied from outside.

In addition, the LCD according to the present invention can be more simply constructed and can effectively reduce production costs, since it does not have a conventional optical device such as an external touch screen that may reduce transmission or an internal touch screen that may cause brightness degradation due to reduction in aperture ratio. Also, the LCD according to the present invention can easily detect a signal for recognizing a position since a uniform voltage is supplied to the upper substrate in a driving method.

Also, according to the present invention, since there are several photoconductor materials, one may be suitably selected and may have a useful effect. Particularly, these materials have various reaction times (ranging from $10^{-3}$ to $10^{-9}$ see), and thus a response time may be specified as occasion demands.

While the LCD having a touch screen function using a photoconductor according to the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A liquid crystal display (LCD) having a touch screen function using photoconductor, the LCD comprising:
   first and second substrates, and a liquid crystal layer filled between the first and second substrates,
   wherein the first substrate includes:
   an insulating substrate;
   a touch sensing layer formed under the insulating substrate and sensing a touch position by variation in current or voltage due to change in characteristics of the photoconductor in response to light supplied from outside;
   a light shielding layer formed under the touch sensing layer and preventing leakage of light; and
   a color filter layer including red (R), green (G) and blue (B) color filter patterns to express colors between the pattern of light shielding layer.

2. The LCD according to claim 1, wherein the touch sensing layer is formed of an insulating film having a predetermined thickness, and first and second photoconductive strips perpendicularly crossing each other with the insulating film interposed therebetween.

3. The LCD according to claim 2, wherein the first and second photoconductive strips are formed between the insulating substrate and the light shielding layer in the same pattern as that of the light shielding layer.

4. The LCD according to claim 3, further comprising:
   at least one contact hole formed at contact portions in the light shielding layer and the insulating film to expose the first and second photoconductive strips, in order to make electrical contacts between a source supplying current or voltage to the touch sensing layer, an integrated circuit processing signals sensed from the touch sensing layer, and the first and second photoconductive strips.

5. The LCD according to claim 4, further comprising:
   an insulating layer having a predetermined thickness formed between the touch sensing layer and the light shielding layer, or between the second photoconductive strip and the light shielding layer, when the light shielding layer is formed of a conductive material.

6. The LCD according to claim 5, further comprising:
at least one contact hole formed at contact portions in the light shielding layer, the insulating layer and the insulating film to expose the first and second photoconductive strips, in order to make electrical contacts between a source supplying current or voltage to the touch sensing layer, an integrated circuit processing sensing signals from the touch sensing layer, and the first and second photoconductive strips.

7. The LCD according to claim 6, wherein the source and the integrated circuit are formed on the first substrate to be in direct contact with the first and second photoconductive strips through the contact hole, or formed on the second substrate to be in contact with the first and second photoconductive strips through the contact hole using additional conductive material.

8. The LCD according to claim 4, wherein the source and the integrated circuit are formed on the first substrate to be in direct contact with the first and second photoconductive strips through the contact hole, or formed on the second substrate to be in contact with the first and second photoconductive strips through the contact hole using additional conductive material.

9. The LCD according to claim 3, further comprising:
an insulating layer having a predetermined thickness formed between the touch sensing layer and the light shielding layer, or between the second photoconductive strip and the light shielding layer, when the light shielding layer is formed of a conductive material.

10. The LCD according to claim 9, further comprising:
at least one contact hole formed at contact portions in the light shielding layer, the insulating layer and the insulating film to expose the first and second photoconductive strips, in order to make electrical contacts between a source supplying current or voltage to the touch sensing layer, an integrated circuit processing sensing signals from the touch sensing layer, and the first and second photoconductive strips.

11. The LCD according to claim 10, wherein the source and the integrated circuit are formed on the first substrate to be in direct contact with the first and second photoconductive strips through the contact hole, or formed on the second substrate to be in contact with the first and second photoconductive strips through the contact hole using additional conductive material.

12. The LCD according to claim 2, further comprising:
an insulating layer having a predetermined thickness formed between the touch sensing layer and the light shielding layer, or between the second photoconductive strip and the light shielding layer, when the light shielding layer is formed of a conductive material.

13. The LCD according to claim 12, further comprising:
at least one contact hole formed at contact portions in the light shielding layer, the insulating layer and the insulating film to expose the first and second photoconductive strips, in order to make electrical contacts between a source supplying current or voltage to the touch sensing layer, an integrated circuit processing sensing signals from the touch sensing layer, and the first and second photoconductive strips.

14. The LCD according to claim 13, wherein the source and the integrated circuit are formed on the first substrate to be in direct contact with the first and second photoconductive strips through the contact hole, or formed on the second substrate to be in contact with the first and second photoconductive strips through the contact hole using additional conductive material.

15. The LCD according to claim 1, wherein the photoconductor is formed of one selected from the group consisting of CdS, CdSe, ZnO, Se, PbS, InSb and PbO.

* * * * *